Sept. 18, 1951  L. S. HAMER  2,568,232
UNION TYPE COUPLING FOR PIPES OR THE LIKE
Filed July 28, 1949
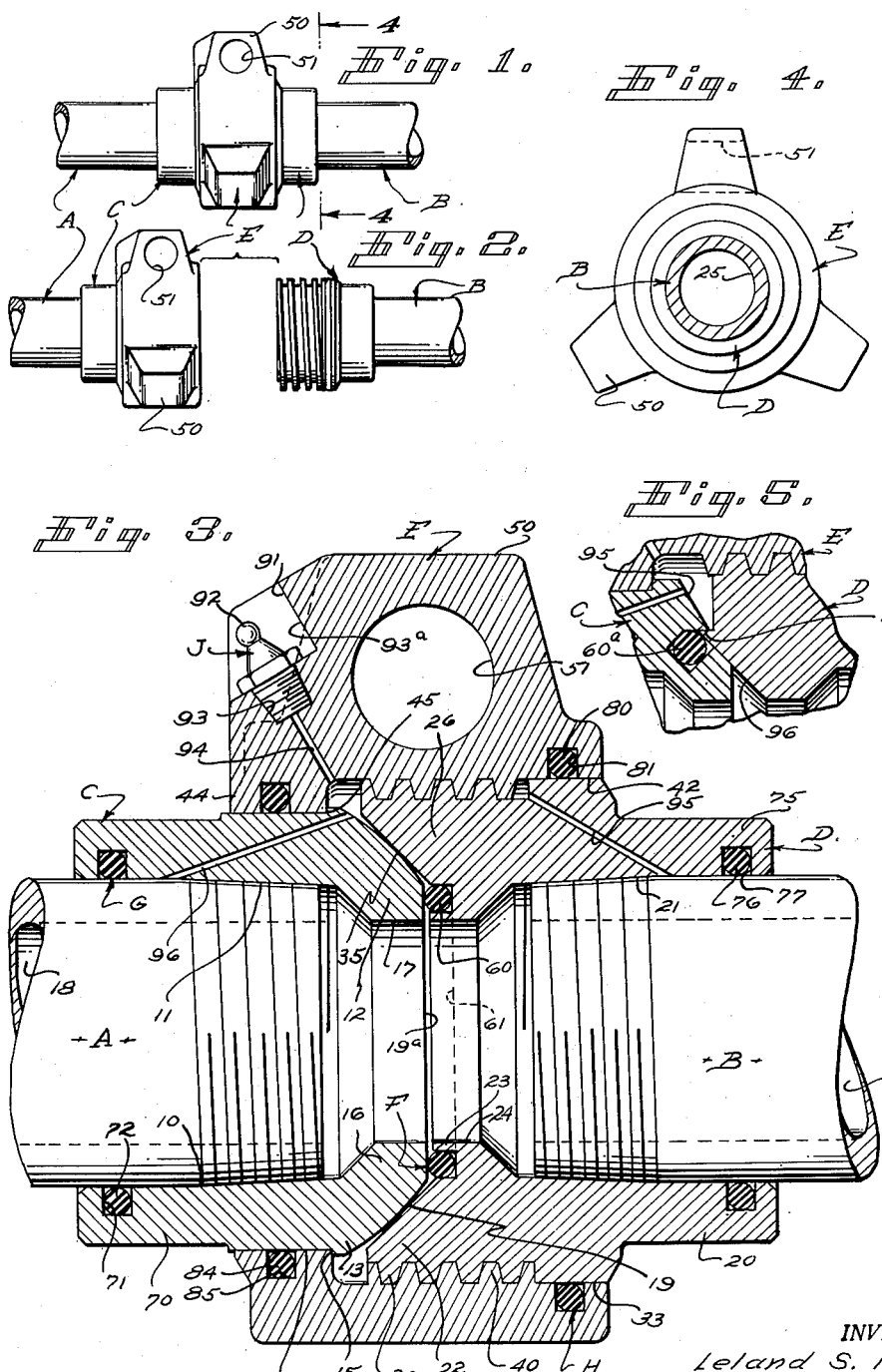
INVENTOR.
Leland S. Hamer
BY
Attorney Patented Sept. 18, 1951

2,568,232

UNITED STATES PATENT OFFICE 2,568,232

UNION TYPE COUPLING FOR PIPES OR THE LIKE

Leland S. Hamer, Long Beach, Calif.

Application July 28, 1949, Serial No. 107,225

4 Claims. (Cl. 285—122)

1

This invention relates to a union type coupling for pipes, or the like, and it is a general object of the invention to provide such a structure which is simple and inexpensive of manufacture, is quick, simple and convenient to use or operate, and is highly effective and dependable in operation.

The device of the present invention involves, generally, two pipe sections applicable to pipes which are to be joined and which have opposing ends that abut, a coupling sleeve having shouldered engagement with one of the pipe sections and having threaded engagement with the other pipe section. The invention provides a seal between the opposing or abutting inner ends of the pipe sections and at this point the structure is such as to allow for certain relative movement or flexibility between the sections. The invention further provides sealing means between each pipe section and the pipe to which it is applied, and also sealing means between the sleeve and each of the pipe sections. Further, the invention provides lubricant handling means which includes a fitting carried by the sleeve and which handles lubricant such as grease, or the like, so that the threaded engagement between the sleeve and the threaded pipe section is lubricated for easy, dependable operation. As a feature of construction the sleeve has circumferentially spaced radially projecting lugs in the form of ribs that extend lengthwise of the coupling. At least one lug is provided with an opening or hole which accommodate operating tools, lines, or handling equipment of various kinds.

It is a general object of this invention to provide a union type coupling of the general character referred to involving a coupling sleeve with projecting lugs so formed and related that they can be acted upon either by a bar or other operating tool, or by a hammer or sledge, one of the lugs being operated so it can be engaged by a line or other equipment as circumstances may require.

A further object of the invention is to provide a coupling of the general character referred to having pipe sections with large, effective, abutting ends and which define a flow passage of substantially the same size as the pipe openings.

Another object of the invention is to provide a union type coupling of the general character referred to in which lubricant handling means serves to lubricate the threaded engagement involved in the coupling so that the structure does not become corroded or fouled but is always ready for free, easy operation.

It is a further object of the invention to provide a union of the general character referred to including sealing means at the various points where leakage may occur, the sealing means being of such construction and so located that the union

2 remains tight and free of leakage under severe operating conditions or over an extended period of time.

The various objects and features of my invention will be fully understood from the following detailed description of typical preferred forms and applications of my invention, throughout which description reference is made to the accompanying drawings, in which:

Fig. 1 is a side elevation of a coupling embodying the present invention, showing it connecting two aligned sections of pipe. Fig. 2 is a view of the parts shown in Fig. 1 showing the coupling disengaged so that the pipe sections thereof are separated. Fig. 3 is an enlarged longitudinal sectional view of the structure shown in Fig. 1, illustrating details of construction embodied in the coupling of the present invention. Fig. 4 is an enlarged detailed transverse sectional view taken substantially as indicated by line 4—4 on Fig. 1. Fig. 5 is fragmentary view illustrating a form of construction different from that shown in Fig. 3.

The structure embodying the present invention is applicable to pipes A and B, or the like, and in its preferred form it involves a pipe section C applicable to the pipe A, a pipe section D applicable to the pipe B, a coupling sleeve E having shouldered engagement with pipe section C and threaded engagement with pipe section D, sealing means F between the abutting or opposing ends of the pipe sections C and D, sealing means G between the pipe sections and the pipes to which they are applied, sealing means H between the sleeve and the pipe section, and lubricant handling means J by which lubricant may be applied to the threaded connection that occurs between the sleeve E and the pipe section D.

Pipe section C involves, generally, an outer end portion 10 which is sleeve-like and which engages over the end of pipe A, as shown in Fig. 3. The outer end portion 10 is internally threaded at 11 to have threaded engagement with the pipe A.

Section C has an inner end portion 12 in the nature of an enlargement. The inner end portion 12 has a portion 13 projecting radially outward beyond the exterior 14 of the inner end portion 10, which projecting part 13 forms or presents an outwardly facing shoulder 15. An inwardly projecting portion 16 extends inwardly and has an opening 17 therethrough corresponding in diameter with the opening 18 through the pipe A. The inner end 19 of inner end portion 20 opposes the inner end of the pipe section D and has a convex face that abuts pipe section D and a flat face 19ª inward of the convex face and in a plane normal to the axis of the coupling to engage the ring of sealing means F. In the form of the invention illustrated in Fig. 3 the convex is pitched or disposed at an angle to the longitudinal axis of the coupling so that it is a projecting or male element which enters the inner end of the pipe section D.

The pipe section D has an outer end portion 20 that receives the end of pipe B and which is threaded at 21 for connection with the threaded end of the pipe. The inner end portion 22 of section D is in the nature of an enlargement with a part 23 projecting inwardly and having an opening 24 corresponding in size with the opening 17 and with the opening 25 in pipe B. An outwardly projecting portion 26 extends the length of the inner end portion 22 and continues somewhat along the outer end portion 20. The exterior of the portion 26 is provided with a coarse or heavy thread 30 that continues along the portion 26 a substantial distance from the inner end of section D. The thread terminates short of the outer end of portion 26 leaving section D with a plain, round or turned part 33 concentric with the longitudinal axis of the joint. The inner end 35 of the pipe section D is inclined or pitched to present a socket-like structure for the reception of the inner end of the pipe section C and when the sections are in operating position, as shown in Fig. 3, they are engaged one in the other and the inner ends of the sections are in engagement or abut each other. There is line contact where the end of section C bears on the end of section D.

The sleeve E is a simple annular or tubular element with a coarse internal thread 40 that engages or cooperates with the thread 30 on pipe section D. The thread 40 extends into the sleeve from a plain or cylindrical portion 42 at one end of the sleeve which portion 42 slidably engages over the plain portion 33 of section D. At the other end of the sleeve there is an inwardly projecting flange portion 44 having a shoulder 45 which opposes and abuts the shoulder 15 on part 13 of section C. Through the construction just described the sleeve E may be rotated on section D causing the shoulder 45 to abut shoulder 15 so that the sections C and D are held or clamped tightly together with their inner ends 19 and 35 in abutting engagement, as shown in Fig. 3.

In accordance with the present invention the sleeve E is provided on its exterior with a plurality of like circumferentially spaced radially projecting lugs 50 and each lug is preferably in the nature of a web extending lengthwise of the coupling. At least one of lugs has a hole or aperture 51 extending transversely through it. The opening 51 is suitable for reception of operating bars or tools and may, on occasion, be used to receive lines or other parts or equipment, as circumstances may require. In the preferred form of the invention the lugs 50 are made thick and are heavy so that they present parts that will effectively withstand hammering action in the event that it becomes necessary or desirable to operate the sleeve by a hammer or sledge.

The sealing means F provided by the present invention and as shown in Fig. 3 of the drawings involves, generally, a simple sealing ring 60, preferably round in cross section, carried in an annular channel 61 in the end of one pipe section concentric with the axis of the coupling. In the case illustrated the channel 61 is in the end 35 of pipe section D and opposes the seals with the face 19a of pipe section C. By employing a sealing ring 60 of the character illustrated in the drawings, and by proportioning the parts so that the ring is somewhat compressed when the pipe sections abut, an effective seal is provided between the pipe sections at their inner ends. It is to be noted that this line of engagement between the pipe sections is outward of the seal F.

The sealing means G seals between each pipe section and the pipe to which it is applied. In the case illustrated each pipe section has a projecting outer end portion 70 with an inwardly opening channel or groove 71 and an annular sealing ring 72 preferably round in cross section, is carried in the groove 71 and seals on or against the exterior of the pipe A. The groove and sealing ring are preferably proportioned so that the ring is somewhat compressed or has sealing engagement with the pipe when the section is engaged on the pipe, as shown in the drawings. A similar sealing construction is provided at a projecting portion 75 of pipe section D where a sealing ring 76 is carried in an annular channel or groove 77 and seals with pipe section B.

Sealing means H provided between the sleeve and the pipe sections provides a separate seal between the sleeve and each pipe section. In the preferred form of the invention a sealing ring 80 is carried in an annular channel or groove 81 in either the sleeve or the pipe section D where the parts 33 and 43 fit together. In the case illustrated the groove 81 is shown in the part 33 and it carries the ring 80 so that it has sealing engagement with the part 42 of the sleeve. At the other end of the sleeve a sealing ring 84 is carried in a channel or groove 85 provided in the sleeve. The ring 84 has sealing engagement with the part 14 of pipe section C which part is preferably finished and turned concentric with the axis of the joint.

The projecting parts 70 and 75 of pipe sections C and D, respectively, in which the packing means G are located, serve as parts accessible to be engaged by wrenches or the like and in the preferred form of the invention the exteriors of these parts are provided with means or may be so finished as to prevent slippage of tools that may be applied to these parts.

The lubricant handling means J is carried by and confined to the sleeve E. In the preferred form of the invention a suitable recess or chamber 91 is provided in one of the lugs 50, preferably at one end of such lug, and a suitable lubricant handling fitting 92 is carried in an opening 93 and has communication with a passage 94 that conducts lubricant from the fitting to the interior of the sleeve where the threads 30 and 40 are engaged. The opening 93 is at the bottom of a socket 93a provided in one of the lugs. The socket 93a receives the fitting 92 so that it is efficiently shielded or protected.

Through the fitting 92 lubricant can be conveniently supplied to the exterior of the sleeve and such lubricant when once applied to the coupling is effectively retained by the various sealing means and acts on the threads between the sleeve and body section D to keep them properly lubricated and to prevent corrosion that might otherwise interfere with proper operation of the structure.

In the preferred form of the invention lubricant carrying ducts or ports 95 and 96 are provided in the pipe sections D and C respectively. The port 95 extends diagonally in pipe section D from a point between section D and sleeve E where the threaded engagement between these sections ends to a point where the extension 75 of section D engages around the pipe P, which point is preferably outward of the threaded engagement between pipe B and the section D. Through the port 95 lubricant is conducted to a point within section D inward of the sealing ring 76 and serves to supplement the sealing or packing action of the sealing ring 76 and also establishes lubricant in or throughout the threaded engagement between pipe B and section D so that these parts can be separated when desired.

The port 96 extends from a point between sleeve E and pipe section C diagonally through section C to a point where the extension 70 of section D engages around the pipe A. This point is preferably outward of the threaded engagement between pipe A and section C and inward of the packing or sealing ring 72. The port 96 conducts lubricant to the interior of the extension 70 of section C so that such lubricant acts to supplement the sealing action of the ring 72 and establishes lubricant in or around the threaded engagement between the pipe section C and the pipe A so that these parts can be readily disengaged when desired.

In the form of the invention illustrated in Fig. 5 of the drawings the inner ends of the pipe sections C and D are relieved at 96 and 96 so that the ends do not abut outward of the sealing ring 60$^a$ and have but limited engagement or bearing against each other immediately inward of the sealing ring 60$^a$. Further, in this form of the invention the inner end of the section D has an annular projection 97 such as to enter the groove or channel 61 carrying the ring 60 so that it engages the ring 60$^a$ and compresses the ring in the desired manner, as will be apparent from the drawings.

In carrying out the invention the sealing rings of the various sealing means may be of material or materials suitable for handling the materials conducted by the pipes or the lubricant employed in the structure, or both. In practice rubber or rubber-like material or felt, or the like, will usually operate satisfactorily.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A pipe union including, two pipe sections each with an outer end portion having a pipe receiving thread and an end portion with an end face, a sleeve surrounding a portion of each section and having threaded engagement with the exterior of one pipe section and having shouldered engagement with the other pipe section and releasably holding the inner end portions of the sections in abutting engagement, sealing means between the said end faces of the pipe sections, and sealing means between the sleeve and each pipe section including packing rings in the sleeve and around the sections beyond each end of the threaded engagement of the sleeve with the first mentioned pipe section.

2. A pipe union including, two pipe sections each with an outer end portion having a pipe receiving thread and an inner end portion with an end face, a sleeve surrounding a portion of each section and having threaded engagement with the exterior of one pipe section and having shouldered engagement with the other pipe section, sealing means between the said end faces of the pipe sections, sealing means carried in the pipe sections adapted to have sealing engagement with pipes engaged thereon, and sealing means between the sleeve and each pipe section, there being ports in the pipe sections extending from points within the sleeve and adjacent the ends of the threaded engagement between the sleeve and said other pipe section to the interiors of the pipe sections outward of the pipe receiving threads.

3. A pipe union including, two pipe sections each with an outer end portion having a pipe receiving thread and an inner end portion with an end face, a sleeve surrounding a portion of each section and having threaded engagement with the exterior of one pipe section and having shouldered engagement with the other pipe section and releasably holding the inner end portions of the sections in abutting engagement, sealing means between the said end faces of the pipe sections, sealing means between the sleeve and each pipe section including packing rings in the sleeve and around the sections beyond each end of the threaded engagement of the sleeve with the first mentioned pipe section, the sleeve having circumferentially spaced radially projecting lugs on the exterior thereof one of which lugs has a recess therein, and a lubricant fitting mounted in said recess and confined thereto, there being a port in the sleeve extending from the fitting to the interior of the sleeve and adapted to pass lubricant into the sleeve.

4. A pipe union including, two pipe sections each with an outer end portion having a pipe receiving thread and an inner end portion with an end face, a sleeve surrounding a portion of each section and having threaded engagement with the exterior of one pipe section and having shouldered engagement with the other pipe section, sealing means between the said end faces of the pipe sections, sealing means carried in the pipe sections adapted to have sealing engagement with the pipes engaged thereon, sealing means between the sleeve and each pipe section, there being ports in the pipe sections extending from points within the sleeve and adjacent the ends of the threaded engagement between the sleeve and said other pipe section to the interiors of the pipe sections outward of the pipe receiving threads, the sleeve having circumferentially spaced radially projecting lugs on the exterior thereof one of which lugs has a recess therein, and a lubricant fitting mounted in said recess and confined thereto, there being a port in the sleeve extending from the fitting to the interior of the sleeve and adapted to pass lubricant into the sleeve.

LELAND S. HAMER.

REFERENCES CITED

The following references are of record in the file of this patent:

UNITED STATES PATENTS

| Number | Name | Date |
|---|---|---|
| 2,101,406 | McKeever | Dec. 7, 1937 |
| 2,208,353 | Woolley | July 16, 1940 |
| 2,318,112 | Stillwagon | May 4, 1943 |
| 2,440,651 | Bell | Apr. 27, 1948 |
| 2,452,275 | Woodling | Oct. 26, 1948 |
| 2,458,714 | Mahoney | Jan. 11, 1949 |